(12) United States Patent
Burke (10) Patent No.: US 11,306,833 B2
(45) Date of Patent: Apr. 19, 2022

(54) PRESSURE RELIEF VALVE ASSEMBLY

(71) Applicant: Eos Energy Storage, LLC, Edison, NJ (US)

(72) Inventor: Connor Burke, Belford, NJ (US)

(73) Assignee: EOS Energy Storage, LLC, Edison, NJ (US)

( * ) Notice: Subject to any disclaimer, the term of this patent is extended or adjusted under 35 U.S.C. 154(b) by 92 days.

(21) Appl. No.: 16/419,209

(22) Filed: May 22, 2019

(65) Prior Publication Data

US 2019/0360602 A1 Nov. 28, 2019

Related U.S. Application Data

(60) Provisional application No. 62/676,925, filed on May 26, 2018.

(51) Int. Cl.
*F16K 39/02* (2006.01)
*F16K 13/02* (2006.01)

(52) U.S. Cl.
CPC .............. *F16K 13/02* (2013.01); *F16K 39/02* (2013.01); *Y10T 137/785* (2015.04); *Y10T 137/789* (2015.04)

(58) Field of Classification Search
CPC ........ F16K 13/02; F16K 15/148; F16K 17/02; F16K 39/02; F16K 47/12; Y10T 137/785; Y10T 137/789; H01M 2/043; H01M 2/1223; H01M 2200/20
See application file for complete search history.

(56) References Cited

U.S. PATENT DOCUMENTS

| 1,759,081 | A | * | 5/1930 | Anderson | F16K 15/04 137/331 |
| 2,571,893 | A | * | 10/1951 | Kendall | H01M 50/308 429/54 |
| 3,208,884 | A | * | 9/1965 | Jensen | H01M 50/333 429/6 |
| 3,398,026 | A | * | 8/1968 | Georges | H01M 50/308 429/54 |
| 4,052,534 | A | * | 10/1977 | Devitt | H01M 50/308 429/86 |
| 4,517,262 | A | * | 5/1985 | Beidler | H01M 50/308 429/87 |
| 4,636,446 | A | * | 1/1987 | Lee | H01M 50/308 429/54 |
| 4,836,151 | A | * | 6/1989 | Litjens | F01L 3/205 123/65 V |

(Continued)

*Primary Examiner* — Matthew W Jellett
(74) *Attorney, Agent, or Firm* — Botos Churchill IP Law LLP (57) ABSTRACT

A pressure relief valve assembly includes a carrier, a valve, and a baffle. The carrier includes a first end and a second end. The first end defines a first opening. The second end defines a second opening. The carrier defines a flow passage extending from the first opening to the second opening. The valve is supported by the carrier and is operable in an open position and a closed position. In the open position, the valve permits a flow of fluid through the first opening. In the closed position, the valve inhibits the flow of fluid through the first opening. The baffle is disposed in the flow passage. The baffle and the carrier collectively define a flowpath extending through the flow passage.

10 Claims, 8 Drawing Sheets

(56) References Cited

U.S. PATENT DOCUMENTS

| | | | | |
|---|---|---|---|---|
| 4,966,539 A * | 10/1990 | Pena | ................. | B29C 45/52 |
| | | | | 425/208 |
| 5,526,843 A * | 6/1996 | Wolf | ................ | B60K 15/03519 |
| | | | | 137/550 |
| 6,062,248 A * | 5/2000 | Boelkins | ............... | F16K 15/148 |
| | | | | 137/118.02 |
| 6,586,131 B2 * | 7/2003 | Hallifax | ................ | F16K 15/044 |
| | | | | 429/53 |
| 8,186,384 B2 * | 5/2012 | Fujii et al. | .............. | F16K 15/14 |
| | | | | 137/854 |
| 8,758,305 B2 * | 6/2014 | Mcmahon | ............. | A61M 39/24 |
| | | | | 604/247 |
| 8,776,831 B2 * | 7/2014 | Otsuka | .................. | F16K 15/148 |
| | | | | 137/843 |
| 9,677,677 B2 * | 6/2017 | Spanevello | ........... | F16K 15/148 |

* cited by examiner

PRESSURE RELIEF VALVE ASSEMBLY

CROSS REFERENCE TO RELATED APPLICATION

This U.S. application claims the benefit of U.S. provisional application Ser. No. 62/676,925, filed on May 26, 2018. The entire contents of this patent application are incorporated herein by reference in its entirety.

FIELD OF THE INVENTION

The present invention relates generally to a pressure relief valve assembly, and more particularly to a pressure relief valve assembly having a baffle.

BACKGROUND OF THE INVENTION

This section provides background information related to the present invention and is not necessarily prior art.

As part of the energy storage or energy supply process, a traditional electrochemical energy cell or electric energy storage device, such as a battery, often generates gas (e.g., bromide gas, hydrogen gas, or water vapor). In order to prevent a harmful, pressurized buildup of such gas within the storage device, a traditional electrochemical cell often includes a pressure relief valve that allows pressurized gas generated inside the cell to escape to the surrounding atmosphere, and prevents atmospheric gases and other fluids from entering the electrochemical cell from the surrounding atmosphere. In allowing pressurized gas to escape from the electrochemical cell into the surrounding atmosphere, it is often important to control the rate and other characteristics of the release of such gas from the cell. For example, consideration might be given to preventing the release of any pressurized liquid from the electrochemical cell into the environment. While known pressure relief valves and valve assemblies have proven acceptable for their intended purposes, a continuous need for improvement in the relevant art remains.

SUMMARY OF THE INVENTION

This section provides a general summary of the invention, and is not a comprehensive disclosure of its full scope or all of its features.

One aspect of the invention provides a pressure relief valve assembly. The pressure relief valve assembly may include a carrier, a valve, and a baffle. The carrier may include a first end and a second end. The first end may define a first opening. The second end may define a second opening. The carrier may define a flow passage extending from the first opening to the second opening. The valve may be supported by the carrier and may be operable in an open position and a closed position. In the open position, the valve may permit a flow of fluid through the first opening. In the closed position, the valve may inhibit the flow of fluid through the first opening. The baffle may be disposed in the flow passage. The baffle and the carrier may collectively define a flowpath extending through the flow passage.

Implementations of the invention may include one or more of the following optional features. In some implementations, the flowpath defines a helical shape.

In some implementations, the baffle is secured within the flow passage in a friction-fit arrangement.

In some implementations, the flow passage is defined by a frustoconically-shaped surface of the carrier. The baffle may define a frustoconical shape.

In some implementations, the baffle extends from a proximal end to a distal end. The proximal end may include a radially-extending head portion. The head portion and the carrier may collectively define a void in fluid communication with the flowpath. In some implementations, the head portion extends annularly about the proximal end of the baffle. The head portion may include an axially extending projection. In some implementations, the head portion defines a first diameter, and the second opening defines a second diameter less than the first diameter.

Another aspect of the invention provides a pressure relief valve assembly. The pressure relief valve assembly may include a carrier, a valve, and a baffle. The carrier may include a flow passage defining a first opening and a second opening. The second opening may define a first diameter. The valve may be supported by the carrier and may be operable in an open position and a closed position. The valve may be configured to inhibit a flow of fluid through the first opening in the closed position. The baffle may be disposed within the second opening and may include a proximal end and a distal end. The proximal end may include a radially-extending head portion defining a second diameter greater than the first diameter.

This aspect may include one or more of the following optional features. In some implementations, the baffle and the carrier define a flowpath extending through the flow passage. The flowpath may define a helical shape. In some implementations, the head portion and the carrier collectively define a void in fluid communication with the flowpath.

In some implementations, the head portion includes an axially extending projection engaging the carrier.

Yet another aspect of the invention provides a pressure relief valve assembly. The pressure relief valve assembly may include a valve and a baffle. The valve may be operable in an open position and a closed position. The valve may be configured to inhibit a flow of fluid from an electrochemical cell in the closed position. The baffle may be configured to engage the electrochemical cell. The baffle may include a proximal end, a distal end, and an outer surface. The outer surface may extend between the proximal end and the distal end. The outer surface may define a channel. The proximal end may define an axially-extending aperture in fluid communication with the channel.

This aspect may include one or more of the following optional features. In some implementations, the channel defines a helical shape.

In some implementations, the baffle defines a frustoconical shape.

In some implementations, the aperture extends through the outer surface.

Yet another aspect of the present invention provides an electrochemical cell having a pressure relief valve assembly. The pressure relief valve assembly may include a valve and a baffle. The valve may be operable in an open position and a closed position. The valve may be configured to inhibit a flow of fluid from an electrochemical cell in the closed position. The baffle may be configured to engage the electrochemical cell. The baffle may include a proximal end, a distal end, and an outer surface. The outer surface may extend between the proximal end and the distal end. The outer surface may define a channel. The proximal end may define an axially-extending aperture in fluid communication with the channel.

In some implementations of this aspect, the valve is coupled to the electrochemical cell, and the baffle is disposed within an exhaust port of the electrochemical cell.

Further areas of applicability will become apparent from the description provided herein. The description and specific examples in this summary are intended for purposes of illustration only and are not intended to limit the scope of the present invention.

BRIEF DESCRIPTION OF THE DRAWINGS

The drawings described herein are for illustrative purposes only of selected configurations and not all possible implementations, and are not intended to limit the scope of the present invention.

Corresponding reference numerals indicate corresponding parts throughout the drawings.

DETAILED DESCRIPTION OF THE EMBODIMENTS

Example configurations will now be described more fully with reference to the accompanying drawings. Example configurations are provided so that this disclosure will be thorough, and will fully convey the scope of the invention to those of ordinary skill in the art. Specific details are set forth such as examples of specific components, devices, and methods, to provide a thorough understanding of configurations of the present invention. It will be apparent to those of ordinary skill in the art that specific details need not be employed, that example configurations may be embodied in many different forms, and that the specific details and the example configurations should not be construed to limit the scope of the invention.

Figure 1:
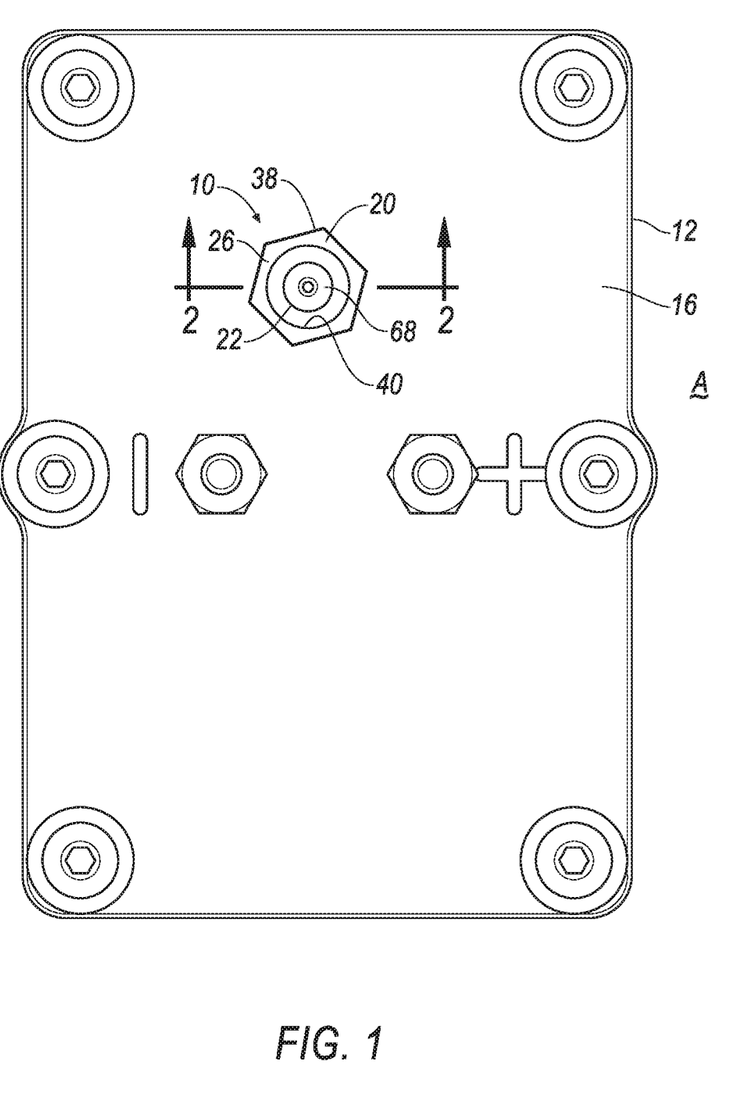
FIG. 1 is a perspective view of an electrochemical cell having a pressure relief valve assembly in accordance with the principles of the present invention.
Figure 2A:
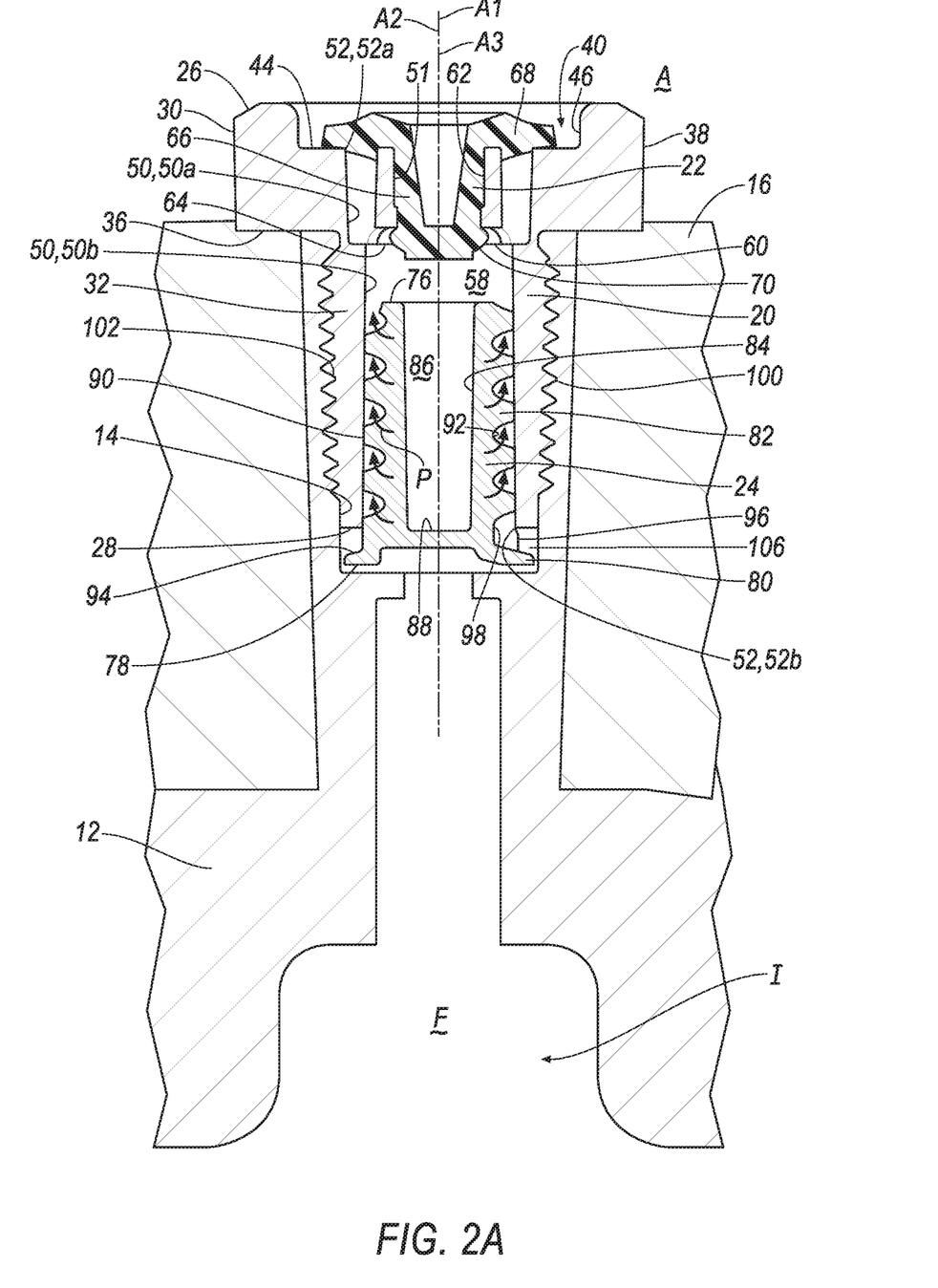
FIG. 2A is a partial cross-sectional view of the electrochemical cell of FIG. 1 showing the pressure relief valve assembly in a closed position.
Figure 2B:
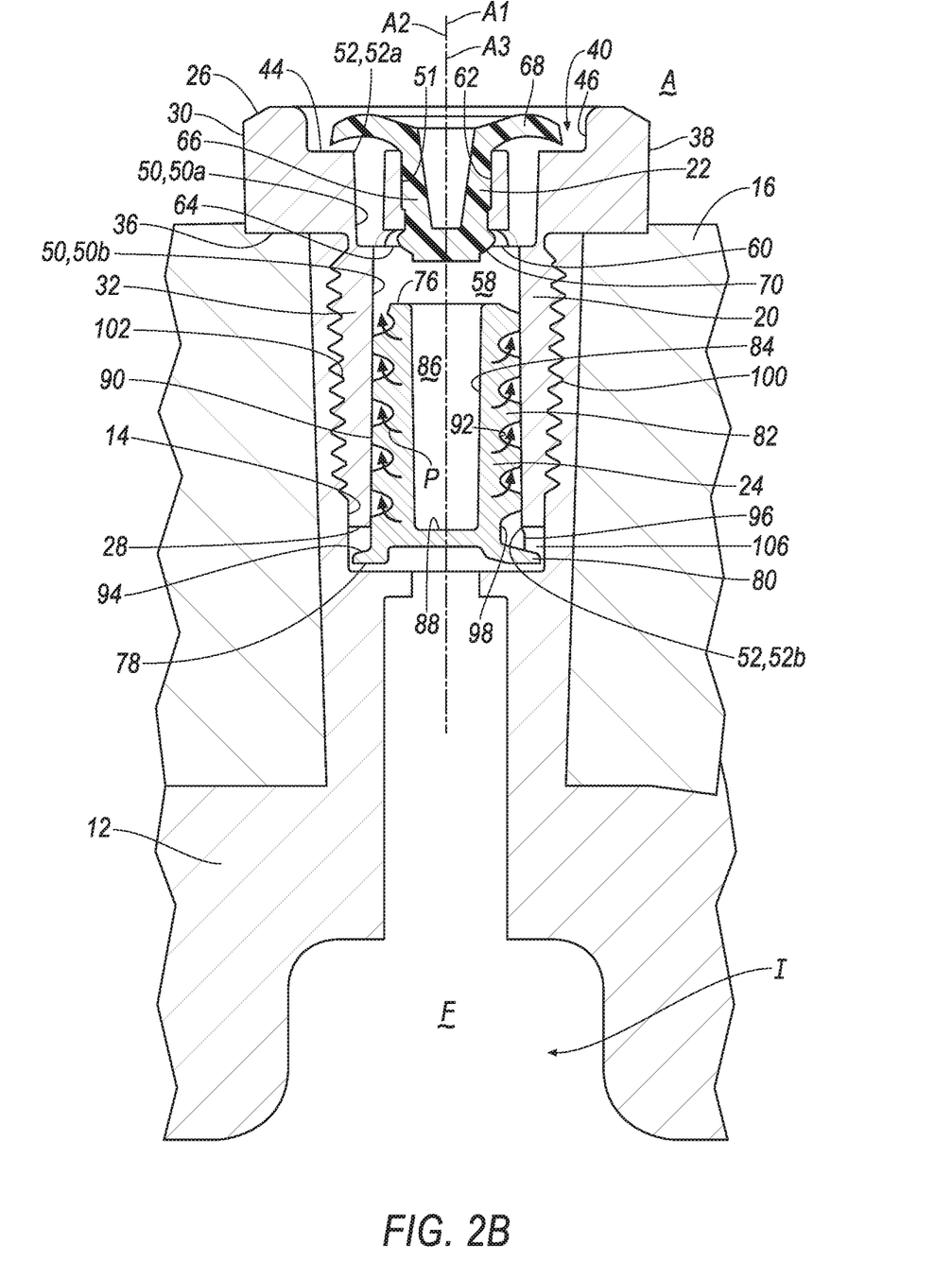
FIG. 2B is a partial cross-sectional view of the electrochemical cell of FIG. 1 showing the pressure relief valve assembly in an open position.
Figure 3:
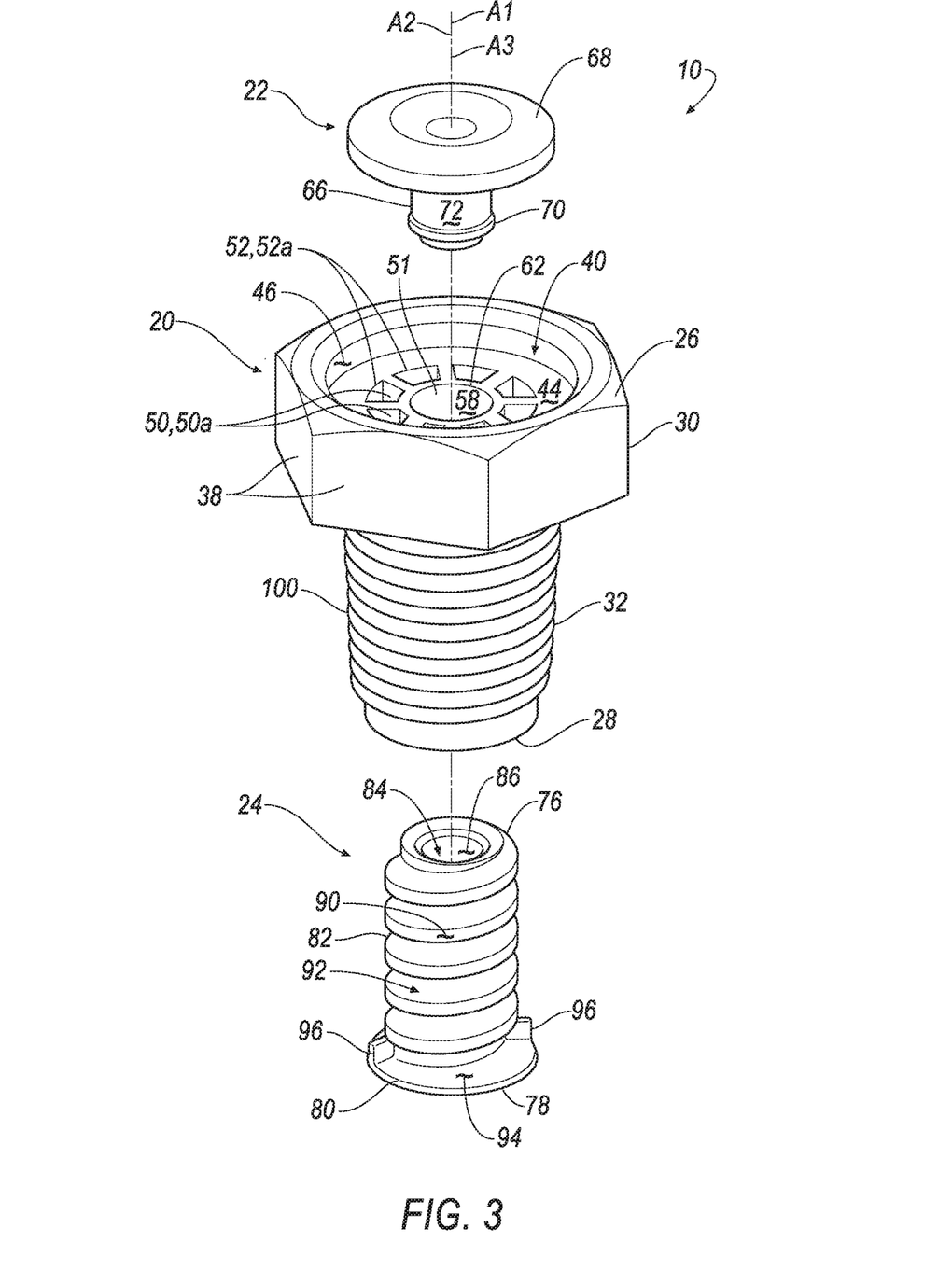
FIG. 3 is an exploded view of the pressure relief valve assembly of FIG. 1.

With reference to FIGS. 1-3, a pressure relief valve assembly 10 is shown. In some implementations, the valve assembly 10 may be coupled to, or otherwise utilized with, an electrochemical cell 12 (e.g., a battery) in order to control a flow of fluid F (e.g., FIG. 2A) from the electrochemical cell 12 to the atmosphere A surrounding the electrochemical cell 12. For example, as illustrated in FIGS. 2A and 2B, the valve assembly 10 may be disposed within an exhaust port 14 of the electrochemical cell 12. In some configurations, the exhaust port 14 is formed in a lid 16 of the electrochemical cell 12. As will be explained in more detail below, the valve assembly 10 may operate in an open position and a closed position. In the open position, the valve assembly 10 permits fluid (e.g., gases) within the cell 12 to flow through the exhaust port 14 formed through the lid 16. In the closed position, the valve assembly 10 prevents fluid from flowing through the exhaust port 14 formed through the lid 16.

With reference to FIGS. 2A-3, the valve assembly 10 may include a carrier 20, a valve member 22, and a baffle 24. The carrier 20 may include a proximal end 26 and a distal end 28. The distal end 28 may be generally opposite the proximal end 26. In some implementations, the carrier 20 includes a head portion 30 extending from the proximal end 26, and a stem portion 32 extending from the distal end 28 to the head portion 30. For example, as illustrated in FIGS. 2A and 2B, the head portion 30 may extend along (e.g., parallel to) a longitudinal axis A1 from the proximal end 26, and the stem portion 32 may extend along (e.g., parallel to) the longitudinal axis A1 from the distal end 28 to the head portion 30. In this regard, the proximal and distal ends 26, 28 may each extend in a radial direction relative to the axis A1. In some implementations, the head portion 30 and the stem portion 32 are concentrically disposed about the longitudinal axis A1.

The head portion 30 may include a stop surface 36, a plurality of engagement surfaces 38, and a recess 40. The stop surface 36 may extend radially outwardly from the stem portion 32. In some implementations, the stop surface 36 defines a planar construct extending substantially perpendicular to the axis A1.

The engagement surfaces 38 may extend axially between the stop surface 36 and the proximal end 26 of the carrier 20. In some implementations, the engagement surfaces 38 define a polygonal (e.g., rectangular, hexagonal, etc.) shape concentrically disposed about the axis A1. In this regard, the engagement surfaces 38 may be configured for engagement by a wrench, pliers, or other suitable tool for rotating the carrier 20 about the axis A1 to couple the carrier to the electrochemical cell 12.

The recess 40 may be formed in the proximal end 26 of the carrier 20 and may be defined by an end wall 44 and a peripheral wall 46. The end wall 44 may define a planar construct extending substantially perpendicular to the axis A1. In this regard, in some implementations the end wall 44 is substantially parallel to the stop surface 36. The peripheral wall 46 may extend axially from the end wall 44 towards the proximal end 26 of the carrier 20. In some implementations, the peripheral wall 46 defines a substantially circular cylindrical construct. In some configurations, the peripheral wall 46 is concentrically disposed about the axis A1.

The carrier 20 may further define one or more flow passages 50 and a valve engagement feature 51. The one or more flow passages 50 may extend from, and through, the proximal end 26 to, and through, the distal end 28. For example, the proximal end 26 may define one or more openings 52 in fluid communication with the one or more flow passages 50, and the distal end 28 may define one or more openings 52 in fluid communication with the one or more (e.g., 1 to 20, 2 to 10, or 3 to 8) flow passages 50. In some implementations, the proximal end 26 defines six openings 52a in fluid communication with six flow passages 50a, and the distal end 28 defines one opening 52b in fluid communication with one flow passage 50b in fluid communication with the flow passage 50b.

As illustrated in FIGS. 2A and 2B, the openings 52a and the flow passages 50a may be concentrically disposed about the axis A1. In some implementations, the flow passages 50a extend through the head portion 30 of the carrier 20 in a direction substantially parallel to the axis A1. For example, the opening 52b and the flow passage 50b may be concentrically formed relative to the axis A1. In this regard, the flow passage 50b may extend through the stem portion 32 of the carrier 20 in a direction substantially parallel to the axis A1. For example, the flow passage 50b may be defined by a surface 58 disposed about the axis A1. In some implementations, the surface 58 tapers radially inwardly in a direction extending from the distal end 28 of the carrier 20. In this regard, the surface 58 may define a substantially frustoconical shape having a radially extending surface 60 opposite the opening 52b.

The valve engagement feature 51 may include an aperture 62 formed in the end wall 44 of the carrier 20. For example, the aperture 62 may define a through hole extending through the surface 60 and the end wall 44, such that the surface 60 defines an annular shoulder 64 disposed about the axis A1. Accordingly, the aperture 62 may communicate with the flow passage 50b and the recess 40. In some implementations, the aperture 62 is concentrically formed relative to the axis A1 such that the flow passages 50a or the openings 52a are concentrically disposed about the aperture 62.

The valve member 22 may include a stem portion 66 and a head portion 68. The stem portion 66 may extend along (e.g., parallel to) a longitudinal axis A2. In some implementations, the stem portion 66 includes an annular flange 70 extending radially outwardly from an outer surface 72 (FIG. 3) of the stem portion 66. The head portion 68 may extend radially outwardly from the stem portion 66 in a direction substantially perpendicular to the longitudinal axis A2. In some implementations, the head portion 30 and the stem portion 32 are concentrically disposed about the longitudinal axis A2 such that the valve member 22 defines a substantially umbrella shape.

The baffle 24 may include a proximal end 76 and a distal end 78 defining an axially-extending length L (FIG. 4) therebetween. The distal end 78 may be generally opposite the proximal end 76. In some implementations, the baffle 24 includes a head portion 80 extending from the distal end 78, and a stem portion 82 extending from the proximal end 76 to the head portion 80. For example, as illustrated in FIGS. 2A and 2B, the head portion 80 may extend along (e.g., parallel to) a longitudinal axis A3 from the distal end 78, and the stem portion 82 may extend along (e.g., parallel to) the longitudinal axis A3 from the proximal end 76 to the head portion 80. In this regard, the proximal and distal ends 76, 78 may each extend in a radial direction relative to the axis A3. In some implementations, the head portion 80 and the stem portion 82 are concentrically disposed about the longitudinal axis A3.

Figure 4:
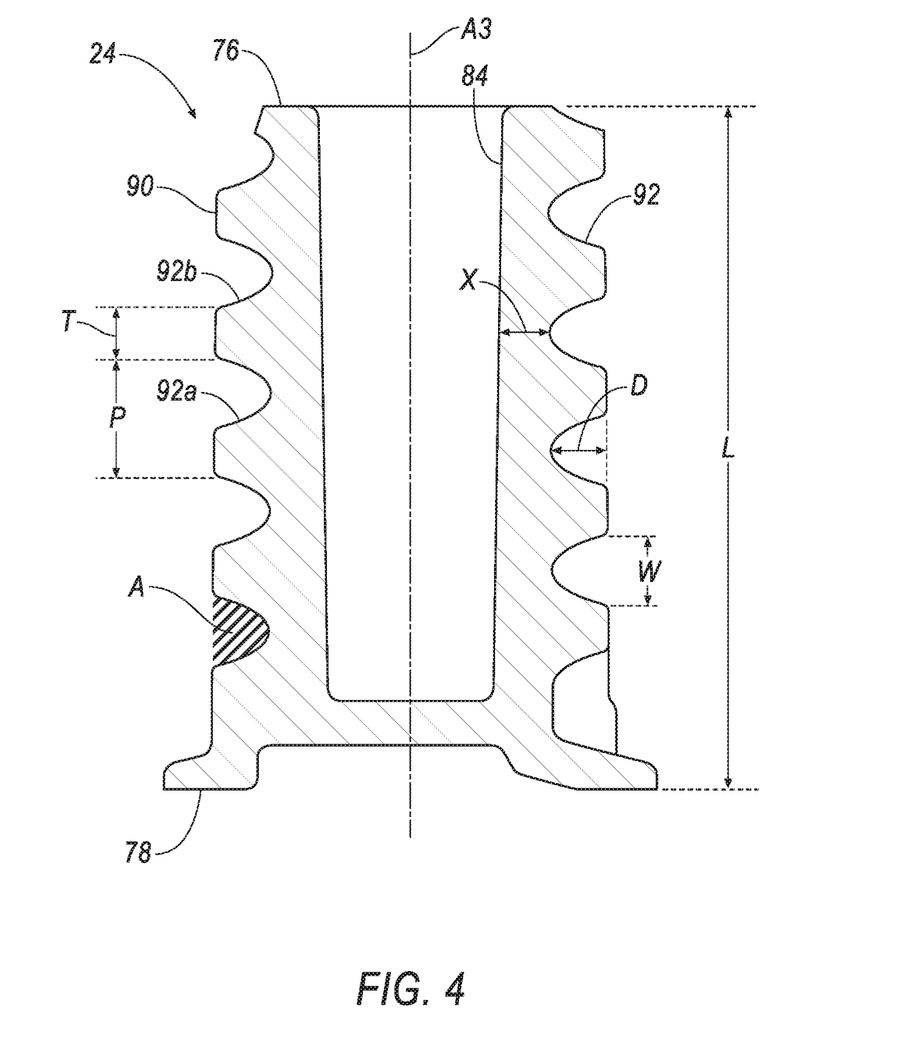
FIG. 4 is a cross-sectional view of a baffle of the pressure relief valve assembly of FIG. 1.

The proximal end 76 of the baffle 24 may define an axially-extending bore 84 (e.g., a hollow core). The bore 84 may extend through the stem portion 82 of the baffle 24 in a direction substantially parallel to the axis A3. For example, the bore 84 may be defined by a surface 86 disposed about the axis A3. In some implementations, the surface 86 tapers radially inwardly in a direction extending from the proximal end 76 of the baffle 24. In this regard, the surface 86 may define a substantially frustoconical shape having a radially extending surface 88 opposite the proximal end 76.

The stem portion 82 may further include, or otherwise be defined by, an outer surface 90 disposed about the axis A3. In some implementations, the outer surface 90 tapers radially outwardly in a direction extending from the proximal end 76 of the baffle 24. In this regard, the outer surface 90 may define a substantially frustoconical shape.

The outer surface 90 may further define a channel 92 extending from the head portion 80 to the proximal end 76. As illustrated in FIG. 3, in some implementations, the channel 92 is helically disposed about the axis A3. In other implementations, the channel 92 may extend in a serpentine or other multi-directional path traversing from the head portion 80 to the proximal end 76. In this regard, the channel 92 may extend along the length L of the baffle 24. As illustrated in FIG. 4, the channel 92 may define an axially-extending cross-sectional area A defined by an axially-extending height W of the channel 92 and a radially-extending depth D of the channel 92. As previously described, the channel 92 may be disposed in a helical configuration about the axis A3, and along the length L, such that the outer surface 90 defines an axially-extending thickness T between adjacent laps 92a, 92b of the channel 92. In some implementations, the pitch P and depth D of the channel 92 are such that the axially-extending thickness T is substantially equal (e.g., +/−10%) to a radially-extending thickness X of the baffle 24 extending from the root of the channel 92 to the bore 84. The pitch P, height W, and depth D of the channel 92 may be such that the length of the channel 92 is maximized for the dimensions of the baffle 24, and such that the area A is optimized for the properties (e.g., density, viscosity, surface tension, etc.) of the fluid F in the electrochemical cell 12.

The head portion 80 may extend radially outwardly from, or otherwise relative to, the stem portion 82. In this regard, in some implementations, the stem portion 82 defines a maximum diameter, and the head portion 80 defines a maximum diameter that is greater than the maximum diameter of the stem portion 82. Accordingly, the head portion 80 may include a surface 94 disposed between the proximal end 76 and the distal end 78 relative to the axis A3. In some implementations, the surface 94 extends radially-outwardly from, or otherwise relative to, the outer surface 90. The surface 94 may include one or more axially-extending projections 96. In some implementations, the surface 94 includes two projections 96. It will be appreciated, however, that the surface 94 may include more or less than two projections 96 within the scope of the present invention. In some configurations, one of the projections 96 is disposed adjacent an end 98 (FIGS. 2A and 2B) of the channel 92.

As previously described, in an assembled configuration, the valve assembly 10 may be disposed within the exhaust port 14 of the electrochemical cell 12. For example, as illustrated in FIGS. 2A and 2B, in some implementations, the stem portion 32 of the carrier 20 may include a threaded outer surface 100 that threadably mates with a threaded interior surface 102 defining the exhaust port 14, in order to secure the carrier 20 to the electrochemical cell 12. It will be appreciated, however, that the carrier 20 may be secured within the exhaust port 14 using other techniques, such as a friction fit or an adhesive, for example.

The valve member 22 may be secured to the carrier 20. In this regard, the valve member 22 may engage the end wall 44. In some implementations, the valve member 22 is coupled to the valve engagement feature 51 of the carrier 20. For example, the stem portion 66 of the valve member 22 may be disposed within the aperture 62 such that (i) the axis A1 is aligned with the axis A2, (ii) the flange 70 engages the surface 60, or (iii) the head portion 68 engages the end wall 44 to prevent fluid communication from the recess 40 to the flow passages 50a through the openings 52a. In this regard, as will be explained in more detail below, the valve member 22 (e.g., the head portion 68) may be moveable between a closed position in which the head portion 68 sealingly engages the end wall 44 to prevent fluid communication from the recess 40 to the flow passages 50a through the openings 52a, and an open position in which the head portion 68 is disengaged from the end wall 44 to allow fluid communication from the flow passages 50a to the recess 40 through the openings 52a.

The baffle 24 may be secured to the carrier 20. For example, the baffle 24 may be disposed within the flow passage 50b such that (i) the axis A1 is aligned with the axis A3, (ii) the outer surface 90 of the baffle 24 engages the surface 58 of the carrier 20, or (iii) the projections 96 of the baffle 24 engage the distal end 28 of the carrier 20. In some implementations the diameter of the outer surface 90 may be substantially equal to or slightly greater than the diameter of the surface 58 such that the outer surface 90 engages the surface 58 in a friction-fit configuration.

The surface 58 of the carrier 20 and the outer surface 90 and channel 92 of the baffle 24 may collectively define a flowpath P (FIGS. 2A and 2B) extending through the exhaust port 14 of the electrochemical cell 12 to provide fluid communication (e.g., of the fluid F) between an interior I of the electrochemical cell 12 and the atmosphere A. In some implementations, the flowpath P defines a helical shape extending from the distal end 28 of the carrier 20 to the proximal end 76 of the baffle 24.

The surface 94 of the baffle 24 and the distal end 28 of the carrier 20 may define a void 106 in fluid communication with the flowpath P. The void 106 may be disposed or otherwise extend axially and radially relative to the axes A2, A3. In some implementations, the void 106 defines an axially-extending height. The axially-extending height of the void 106 may be between one-quarter millimeter and two millimeters. In some implementations, the axially-extending height of the void 106 is substantially equal to one millimeter. In this regard, the axially-extending height of the void 106 may provide a narrow entry for the flow of fluid F from the interior I of the electrochemical cell 12 to the flowpath P.

During operation, the fluid F may travel along the flowpath P within the channel 92 from the interior I of the electrochemical cell 12 to the flow passages 50a. When the pressure exerted by the fluid F exceeds a predetermined threshold, the fluid F may force the valve member 22 (e.g., the head portion 68) from the closed position (FIG. 2A) to the open position (FIG. 2B) and allow the fluid F to flow from the flow passages 50a to the atmosphere A through the openings 52a. The head portion 80 may serve as a splash guard to prevent the fluid F from travelling in a direction substantially parallel to the axes A1, A2, A3 from the interior I of the electrochemical cell 12 to the flow path P.

Figure 5A:
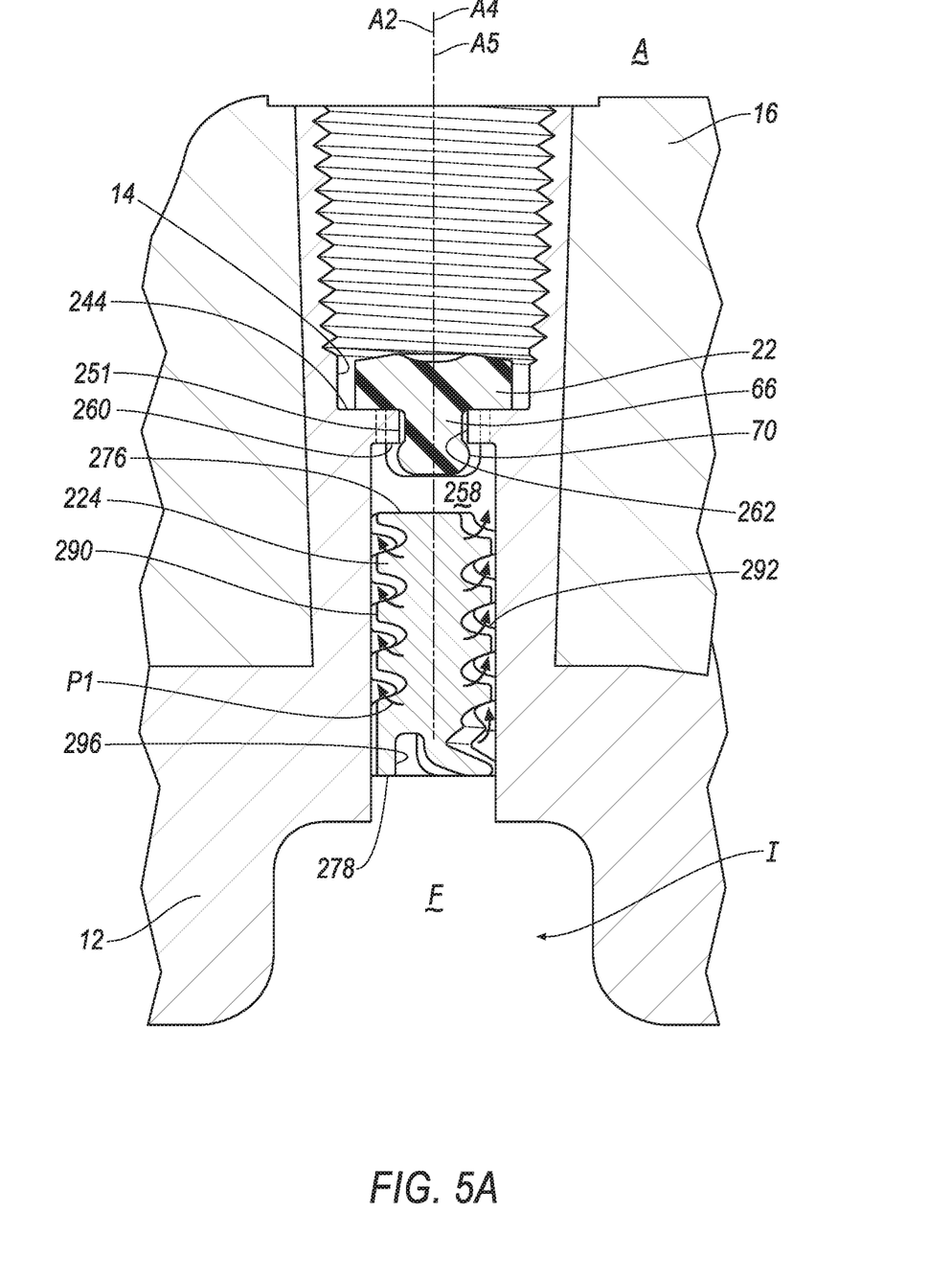
FIG. 5A is a partial cross-sectional view of the electrochemical cell of FIG. 1 having another pressure relief valve assembly shown in a closed position in accordance with the principles of the present invention.
Figure 5B:
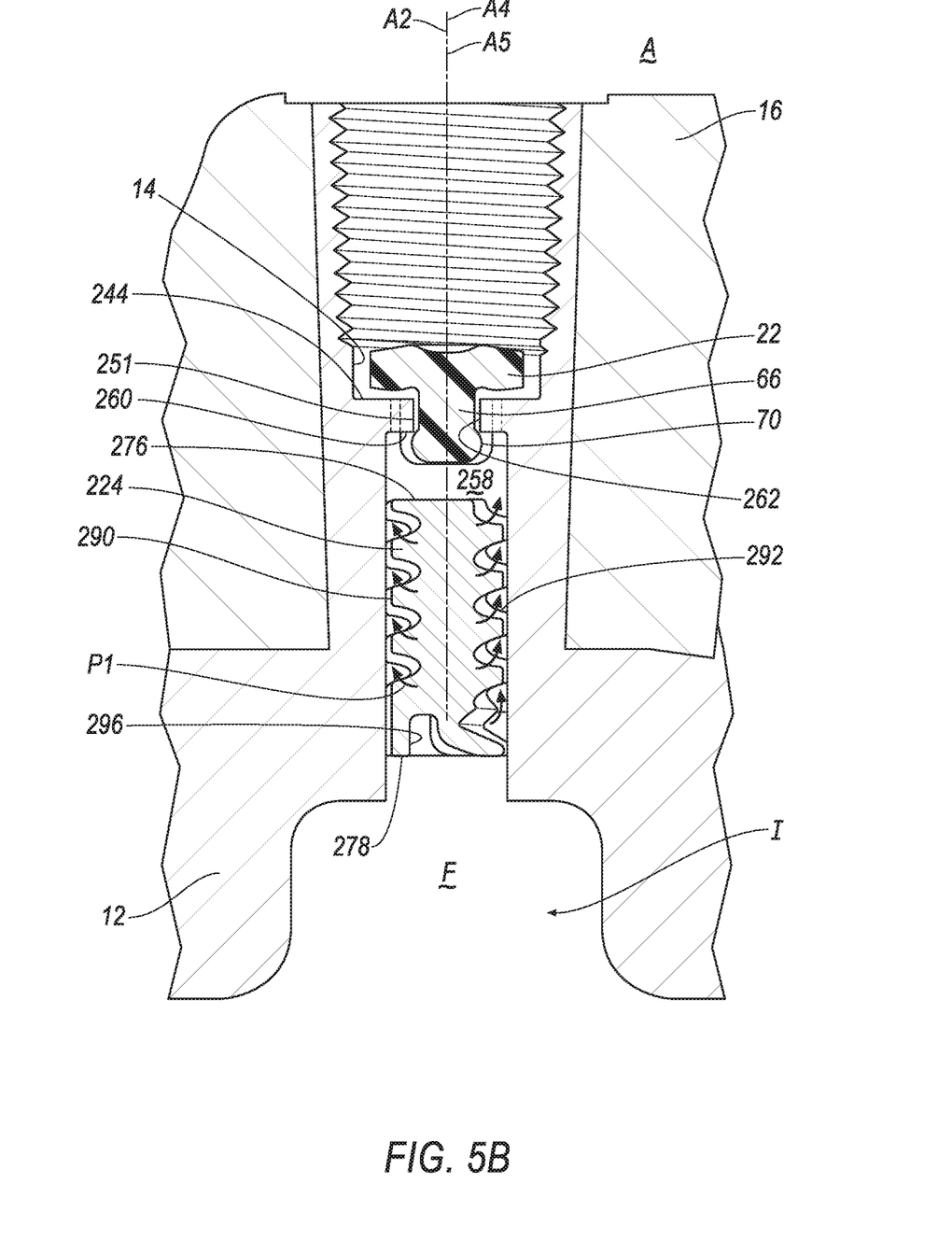
FIG. 5B is a partial cross-sectional view of the electrochemical cell of FIG. 1 showing the pressure relief valve assembly of FIG. 5A in an open position in accordance with the principles of the present invention.
Figure 6:
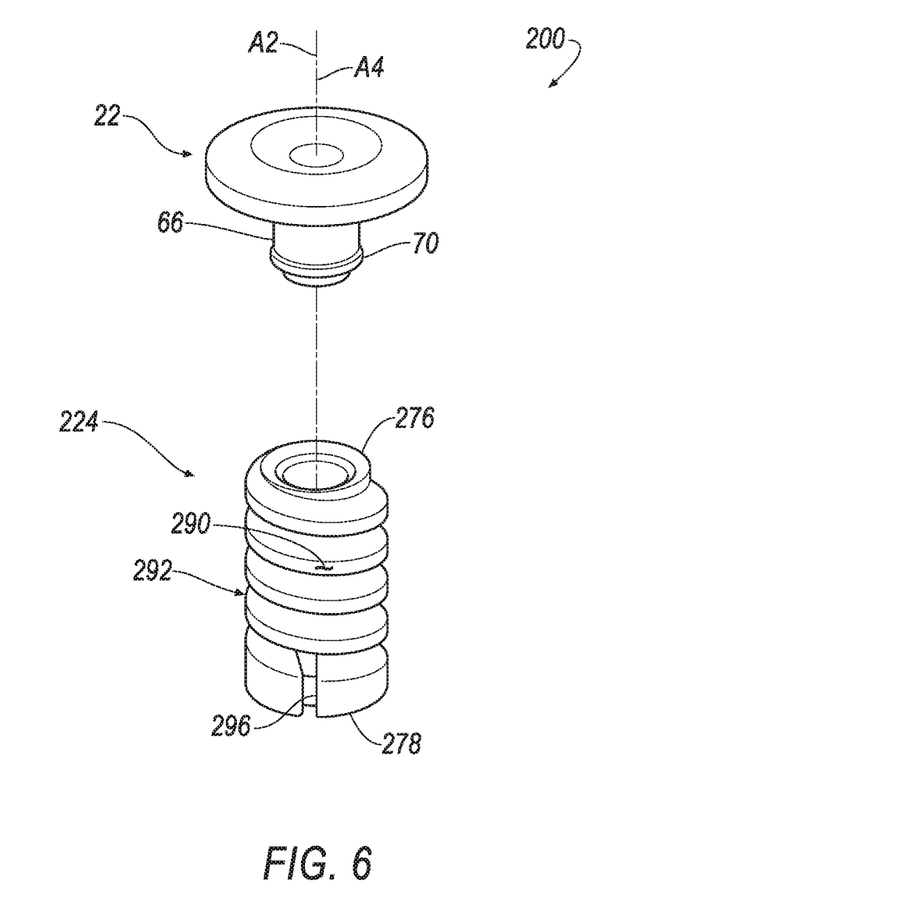
FIG. 6 is an exploded view of the pressure relief valve assembly of FIG. 5A.

With reference to FIGS. 5A-6, another valve assembly 200 (FIG. 6) for use with the electrochemical cell 12 is illustrated. The valve assembly 200 may be substantially similar to the valve assembly 10 except as otherwise shown or described herein. Accordingly, the structure and function of similar features will not be described again in detail. In addition, like reference numerals are used hereinafter and in the drawings to identify like features.

The valve assembly 200 may include the valve member 22 and a baffle 224. The baffle 224 may include a proximal end 276 and a distal end 278. The distal end 278 may be generally opposite the proximal end 276. The baffle 224 may extend along (e.g., parallel to) a longitudinal axis A4 from the proximal end 276 to the distal end 278. In this regard, the proximal and distal ends 276, 278 may each extend in a radial direction relative to the axis A3. In some implementations, the baffle 224 is concentrically disposed about the longitudinal axis A4.

The baffle 224 may further include, or otherwise be defined by, an outer surface 290 disposed about the axis A4. In some implementations, the outer surface 290 tapers radially outwardly in a direction extending from the proximal end 276 of the baffle 224. In this regard, the outer surface 290 may define a substantially frustoconical shape. The outer surface 290 may define a channel 292 extending from the proximal end 276. As illustrated in FIG. 6, in some implementations, the channel 292 is helically disposed about the axis A4. In other implementations, the channel 292 may extend in a serpentine or other multi-directional path traversing from the proximal end 276 to the distal end 278.

The distal end 278 may define one or more apertures 296. In some implementations, the distal end 278 includes a single aperture 296. The aperture 296 may extend axially through the distal end 278 and fluidly-communicate with the channel 292. In some implementations, the aperture 296 is formed in the outer surface 290 and the distal end 278. In some implementations, the aperture 296 defines an axially-extending depth. The axially-extending depth of the aperture 296 may be between one-quarter millimeter and two millimeters. In some implementations, the axially-extending depth of the aperture 296 is substantially equal to one millimeter. In this regard, the axially-extending depth of the aperture 296 may provide a narrow entry for the flow of fluid F from the interior I of the electrochemical cell 12 to the channel 292.

In an assembled configuration, the valve assembly 10 may be disposed within the exhaust port 14 of the electrochemical cell 12. For example, as illustrated in FIGS. 5A and 5B, in some implementations, the valve member 22 and the baffle 24 may be secured within the exhaust port 14. In this regard, the valve member 22 may engage an end wall 244 of the electrochemical cell 12. In some implementations, the valve member 22 is coupled to a valve engagement feature 251 of the electrochemical cell 12. For example, the stem portion 66 of the valve member 22 may be disposed within an aperture 262 such that (i) an axis A5 of the exhaust port 14 is aligned with the axis A2, (ii) the flange 70 engages a surface 260 of the electrochemical cell 12 opposite the end wall 244, or (iii) the head portion 68 engages the end wall 244 to prevent fluid communication from the exhaust port 14 to the interior I of the electrochemical cell 12 through the aperture 262. In this regard, as will be explained in more detail below, the valve member 22 (e.g., the head portion 68) may be moveable between a closed position (FIG. 5A) in which the head portion 68 sealingly engages the end wall 244 to prevent fluid communication from the exhaust port 14 to the interior I, and an open position (FIG. 5B) in which the head portion 68 is disengaged from the end wall 244 to allow fluid communication from the interior I to the exhaust port 14 and the atmosphere A.

The baffle 224 may be disposed within the exhaust port 14 such that (i) the axis A4 is aligned with the axis A5 or (ii) the outer surface 290 of the baffle 224 engages an inner surface 258 of the electrochemical cell 12. In some implementations, the diameter of the outer surface 290 may be substantially equal to or slightly greater than the diameter of the surface 258 such that the outer surface 290 engages the surface 258 in a friction-fit configuration.

The surface 258 of the electrochemical cell 12 and the outer surface 290 and channel 292 of the baffle 224 may collectively define a flowpath P1 extending through the exhaust port 14 of the electrochemical cell 12 to provide fluid communication (e.g., of the fluid F) between the interior I of the electrochemical cell 12 and the atmosphere A. In some implementations, the flowpath P1 defines a helical shape extending from the proximal end 276 of the baffle 224 to the aperture 296 of the baffle 224.

During operation, the fluid F may travel along the flowpath P1 within the channel 292 from the interior I of the electrochemical cell 12 to the proximal end 276 of the baffle 224. When the pressure exerted by the fluid F exceeds a predetermined threshold, the fluid F may force the valve member 22 (e.g., the head portion 68) from the closed position to the open position and allow the fluid F to flow from the exhaust port 14 to the atmosphere A through the aperture 262. The distal end 278 may serve as a splash guard to prevent the fluid F from travelling in a direction substantially parallel to the axes A2, A4, and A5 from the interior I of the electrochemical cell 12 to the flow path P1, other than through the aperture 296.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A pressure relief valve assembly comprising:
a carrier extending from a proximal end to a distal end along a longitudinal axis, the proximal end defining a plurality of first openings and the distal end defining a plurality of second openings, wherein the carrier comprises a plurality of flow passages, each of the plurality of flow passages extending from one of the plurality of first openings to one of the plurality of second openings and the plurality of the first openings concentrically disposed about the longitudinal axis;
a valve supported by the carrier at the proximal end of the carrier and concentrically received therein and moveable between an open position and a closed position, wherein the valve is configured to permit a flow of fluid through the plurality of the first openings in the open position, and the valve is configured to inhibit the flow of fluid through the plurality of the first openings in the closed position; and
a baffle concentrically disposed in the carrier, the baffle and the carrier collectively defining a flowpath in the carrier,
wherein the flowpath defines a helical shape,
wherein the baffle extends from a proximal end to a distal end, the distal end of the baffle including a radially-extending head portion, and
wherein the radially-extending head portion includes an axially extending projection.

2. The pressure relief valve assembly of claim 1, wherein the baffle is secured within the carrier in a friction-fit arrangement.

3. The pressure relief valve assembly of claim 1, wherein an inner surface of the baffle defines a frustoconical shape.

4. The pressure relief valve assembly of claim 3, wherein an outer surface of the baffle defines a frustoconical shape.

5. The pressure relief valve assembly of claim 1, wherein the radially-extending head portion and the carrier collectively define a void in fluid communication with the flowpath.

6. The pressure relief valve assembly of claim 1, wherein the radially-extending head portion extends annularly about the distal end of the baffle.

7. The pressure relief valve assembly of claim 1, wherein the radially-extending head portion defines a first diameter, and a stem portion of the baffle defines a second diameter less than the first diameter.

8. A pressure relief valve assembly comprising:
a carrier extending from a proximal end to a distal end along a longitudinal axis, the proximal end defining a plurality of first openings and the distal end defining a plurality of second openings, wherein the carrier comprises a plurality of flow passages, each extending from one of the plurality of first openings to one of the plurality of second openings and the plurality of the first openings concentrically disposed about the longitudinal axis;

a valve supported by the carrier at the proximal end of the carrier and concentrically received therein and moveable between an open position and a closed position, wherein the valve is configured to permit a flow of fluid through the plurality of the first openings in the open position, and the valve is configured to inhibit the flow of fluid through the plurality of the first openings in the closed position; and a baffle concentrically disposed within the carrier, the baffle and the carrier collectively define a flowpath in the carrier, and the baffle having a proximal end and a distal end, the distal end of the baffle including a radially-extending head portion defining a first diameter, wherein a stem potion of the baffle defines a second diameter less than the first diameter;

wherein the flowpath defines a helical shape, and wherein the radially-extending head portion includes an axially extending projection engaging the carrier.

9. The pressure relief valve assembly of claim 8, wherein the radially-extending head portion and the carrier collectively define a void in fluid communication with the flowpath.

10. An electrochemical cell comprising the pressure relief valve assembly of claim 1, the valve coupled to the electrochemical cell, the baffle disposed within an exhaust port of the electrochemical cell.

* * * * *